(12) United States Patent
Young et al.

(10) Patent No.: US 6,467,733 B1
(45) Date of Patent: Oct. 22, 2002

(54) AERODYNAMIC CONTROL SURFACE SYSTEM

(75) Inventors: Kendall G. Young, Crowley, TX (US); Steven L. Pauletti, Mesquite, TX (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/996,182

(22) Filed: Nov. 28, 2001

(51) Int. Cl.$^7$ .................................................. B64C 3/50
(52) U.S. Cl. ........................ 244/215; 244/213; 244/217; 244/90 R
(58) Field of Search ................................ 244/213, 215, 244/216, 217, 225, 90 R

(56) References Cited

U.S. PATENT DOCUMENTS

| | | | |
|---|---|---|---|
| 2,670,909 A | 3/1954 | Replogle | 244/42 |
| 3,109,613 A | 11/1963 | Bryant et al. | 244/44 |
| 3,944,170 A | 3/1976 | Musgrove | 244/44 |
| 4,286,761 A | 9/1981 | Musgrove | 244/75 R |
| 5,161,757 A | 11/1992 | Large | 244/216 |
| 5,222,699 A | 6/1993 | Albach et al. | 244/213 |
| 5,651,513 A * | 7/1997 | Arena | 244/215 |
| 5,794,893 A | 8/1998 | Diller et al. | 246/213 |
| 6,244,542 B1 * | 6/2001 | Young et al. | 244/213 |
| 6,270,039 B1 * | 8/2001 | Linjama | 244/213 |

* cited by examiner

Primary Examiner—J. Woodrow Eldred
(74) Attorney, Agent, or Firm—Perman & Green, LLP

(57) ABSTRACT

A flight control system provides a maximized mechanical advantage when the load of the airstream on the airfoil is also at a maximum. A control surface is pivotally mounted for movement through a range of positions between a neutral position at which airstream load thereon is a minimum and upwardly and downwardly deflected positions, the airstream load being a maximum in either of the deflected positions. An operator mechanism for moving the control surface between the upwardly and downwardly deflected positions includes a rotor mounted on the airfoil for rotation about a chordwise extending rotary axis and has a horn member with a terminal end offset from the rotary axis. The terminal end of the horn member is slidably engaged with the guide track and an actuator rotates the rotor and by reason of the slidable engagement of the horn member with the guide track moves the control surface.

15 Claims, 9 Drawing Sheets

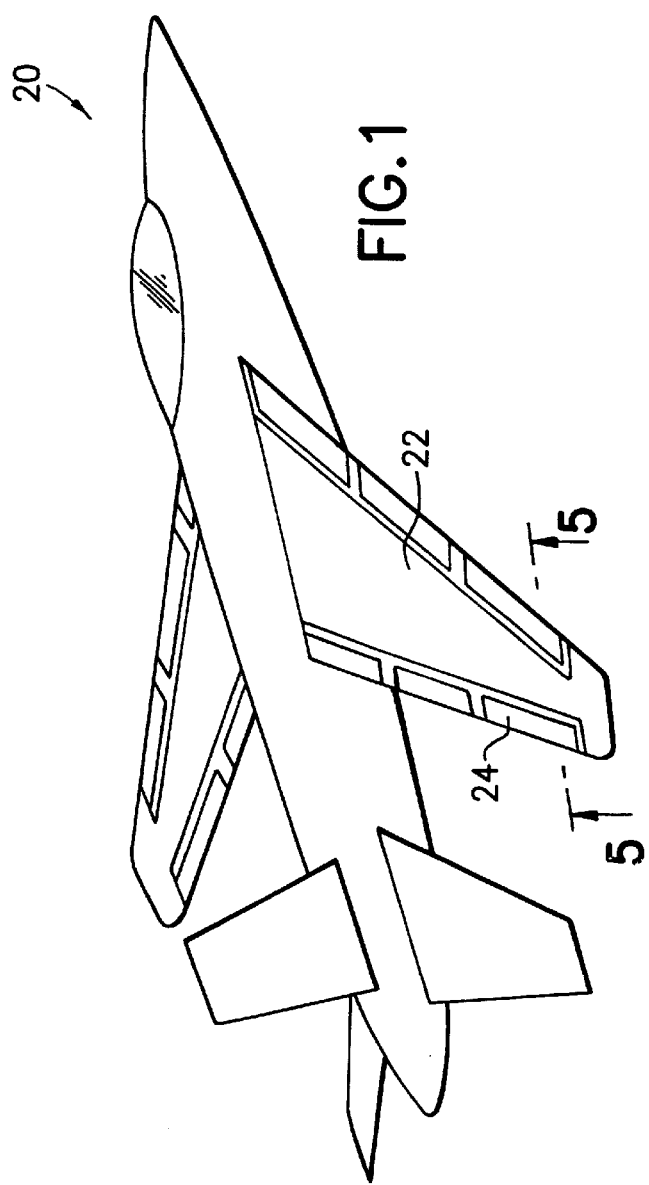
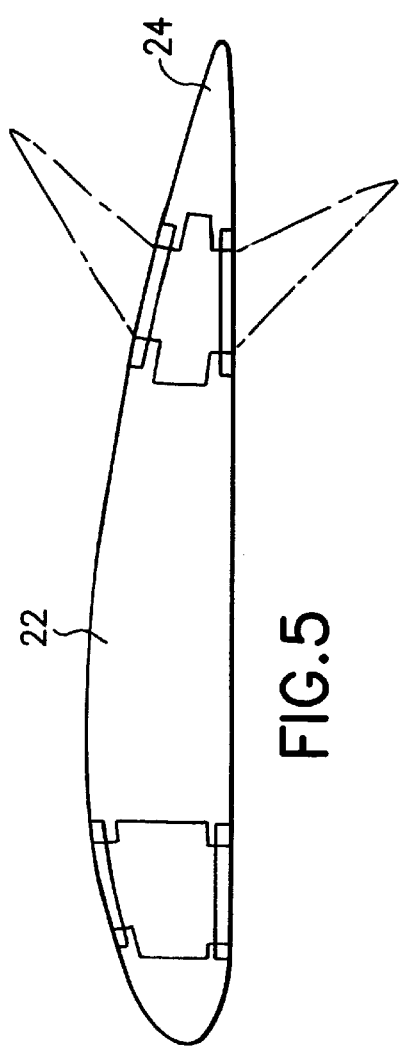

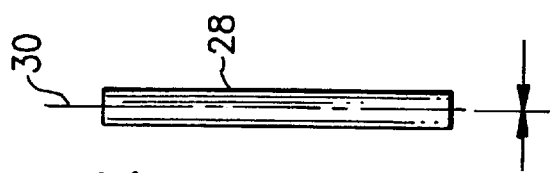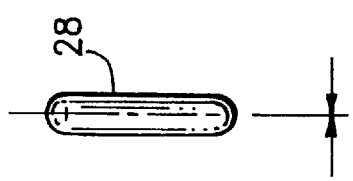
FIG.12  FIG.12A
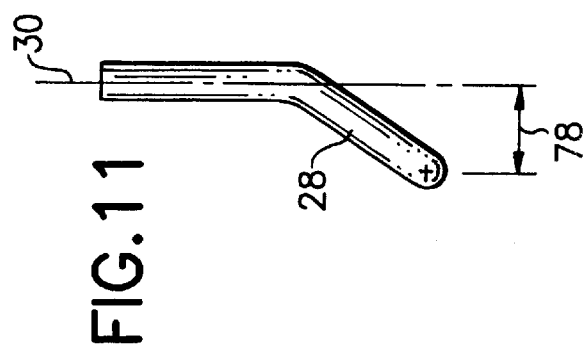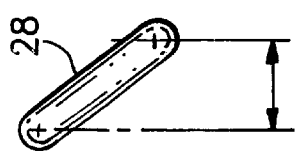
FIG.11  FIG.11A
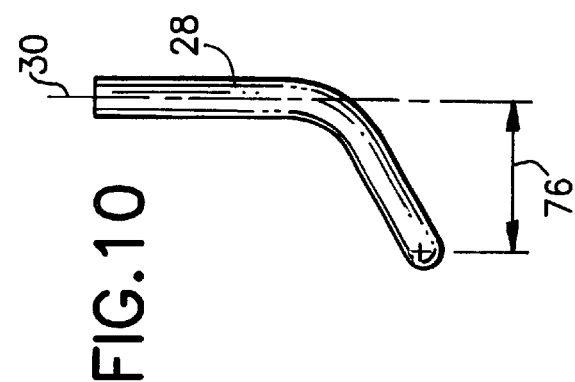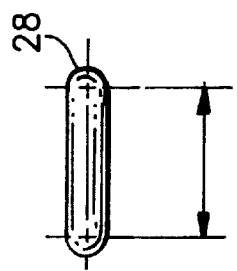
FIG.10  FIG.10A

AERODYNAMIC CONTROL SURFACE SYSTEM

BACKGROUND OF THE INVENTION

1. Field of the Invention

The present invention relates to aircraft control surfaces and, more particularly, to a system for operating an aircraft control surface such that a maximum mechanical advantage of the actuating mechanism is achieved when the control surface is also at its maximum deflected position.

2. Prior Art

The typical wing design for an aircraft includes a primary wing surface, or airfoil, having a leading edge and a trailing edge with a control surface located at the leading and trailing edges of the wing. Flaps and ailerons are both examples of control surfaces, with flaps being designed to increase wing lift and ailerons used for roll axis control. The flaps on each wing operate in unison to increase wing lift by increasing the camber of the wing. By comparison, ailerons are pivoted oppositely to increase lift on one wing while reducing lift on the opposite wing to induce a rolling moment. Similarly, elevator sections of the horizontal tail are pivotably attached to the fixed tail section to vary lift and provide pitch control.

When either the flap or the aileron is activated, the control surface rotates relative to the trailing edge of the wing. Control surfaces are typically rigid structures which maintain their shape throughout rotation. Therefore, gaps or abrupt changes occur at the hinge area of a conventional control surface. This gap increases the drag and lowers the efficiency of the control surface. Additionally, as the control surfaces are rotated, gaps are formed between the ends of the hinged control surface and the adjacent portions of the fixed wing.

A number of patented constructions typify the current state of the art. in regard, both, to the actuating mechanisms and to the desirability of minimizing the effect of discontinuities occurring between the control surface and the wing or fixed airfoil to which the control surface is movably attached. For example, U.S. Pat. Nos. 2,670,909 to Replogle and 5,161,757 to Large both disclose actuating mechanisms for an aircraft control surface in the form of a flap. The flap both rotates and extends relative to the primary airfoil. In each instance, the actuating mechanism employs a "horn" or bent shaft within the flap body that rotates about an axis normal to the trailing edge. However, in each instance, the patented mechanism operates only in a downward direction.

U.S. Pat. Nos. 3,944,170 and 4,286,761 both to Musgrove disclose an eccentric actuator that provides rotation of a flap body.

U.S. Pat. No. 5,222.699 to Albach et al. and assigned to the assignee of the present invention discloses a variable contour aircraft control surface which employs elastomeric transition sections between inboard and outboard edges of the variable contour control surface and a main wing portion. The transition sections include thick elastomeric layers with oversized holes therein and rods positioned in the oversized holes. Some of the rods are attached to the main wing portion while others of the rods are attached to the control surface.

U.S. Pat. No. 3,109,613 to Bryant et al. discloses a variable camber device that recambers the entire aft portion of the wing structure. It maintains a "seamless" hinge line by employing a sliding skin joint, but it does not maintain seamless edges.

It was with knowledge of the foregoing state of the technology that the present invention has been conceived and is now reduced to practice.

SUMMARY OF THE INVENTION

The present invention relates to a flight control system which provides a maximized mechanical advantage when the load of the airstream on the airfoil is also at a maximum. A control surface is mounted on the airfoil for pivotal movement about a spanwise extending axis through a range of positions between a neutral position at which airstream load thereon is a minimum and an upwardly deflected position, in one instance, and a downwardly deflected position in another instance, the airstream load on the control surface being a maximum in either the upwardly deflected position or in the downwardly deflected position. An operator mechanism for moving the control surface between the upwardly deflected and downwardly deflected positions includes a rotor mounted on the airfoil for rotation about a chordwise extending rotary axis and has a horn member with a terminal end offset from the rotary axis. The terminal end of the horn member is slidably engaged with the guide track generally in the plane of the airfoil and an actuator serves to rotate the rotor about the rotary axis and by reason of the slidable engagement of the terminal end of the horn member with the guide track thereby moves the control surface between the upwardly deflected and downwardly deflected positions.

A primary feature, then, of the present invention is the provision of a flight control system for an aircraft according to which a maximum mechanical advantage of the actuating mechanism for an aircraft control surface is achieved when the control surface is also at its maximum deflected position.

Another feature of the present invention is the provision of such a flight control system according to which the aircraft wing structure includes a control surface that allows for variable camber of the wing while eliminating any gap or abrupt change between the trailing edge of the wing and the joining edges of the control surface.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein:

FIG. 1 is a perspective view of an aircraft embodying the novel flight control system of the present invention;

FIG. 5 is a cross section view taken generally along line 5—5 in FIG. 1;

FIGS. 10, 11, and 12 are detail diagrammatic top plan views illustrating successive positions of a major component of the present invention;

FIGS. 10A, 11A, and 12A are detail diagrammatic elevation views illustrating the respective successive positions of the major component illustrated in FIGS. 10, 11, and 12;

DETAILED DESCRIPTION OF THE PREFERRED EMBODIMENTS

Figure 2:
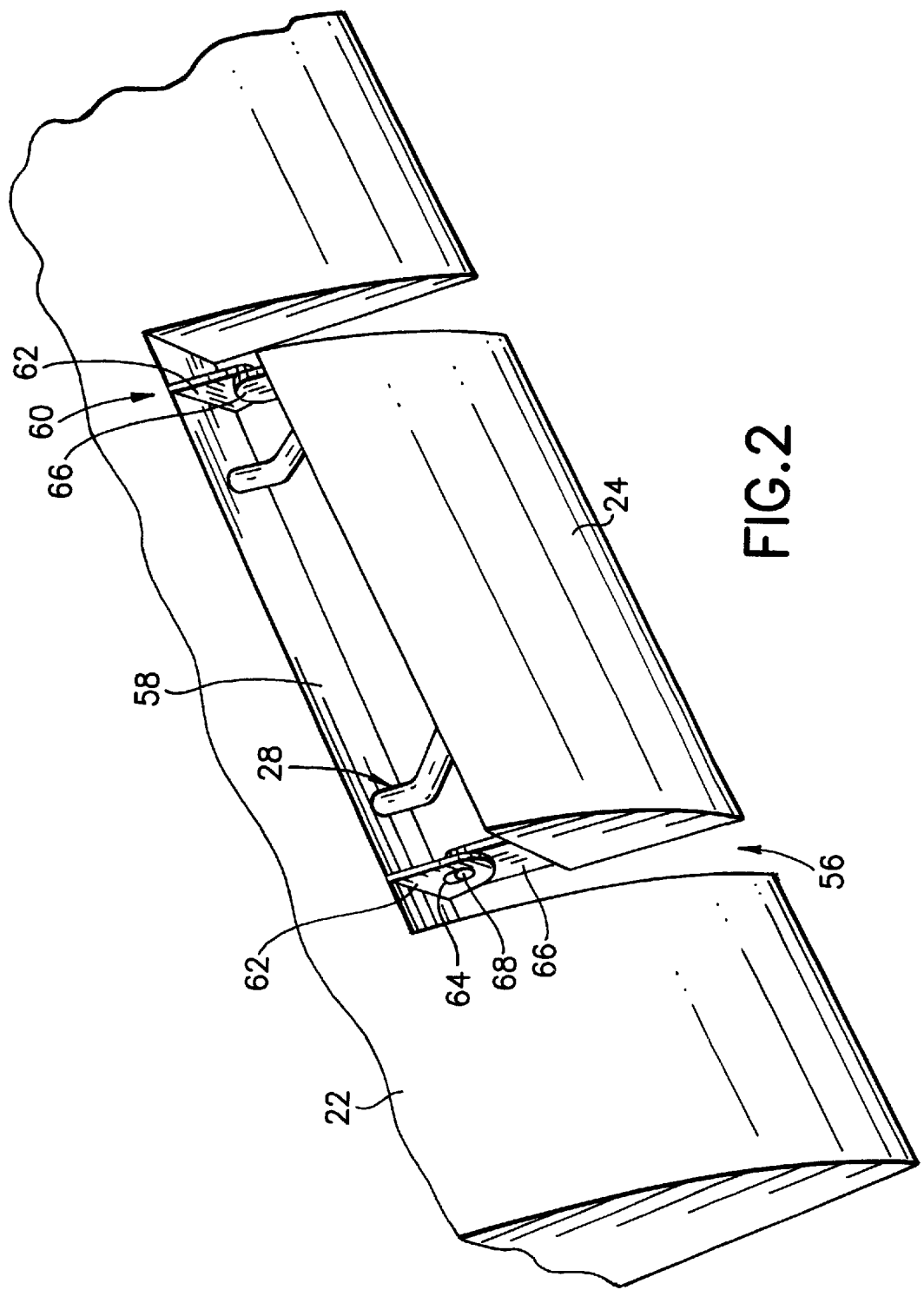
FIG. 2 is a detail perspective view illustrating a portion of FIG. 1.
Figure 3:
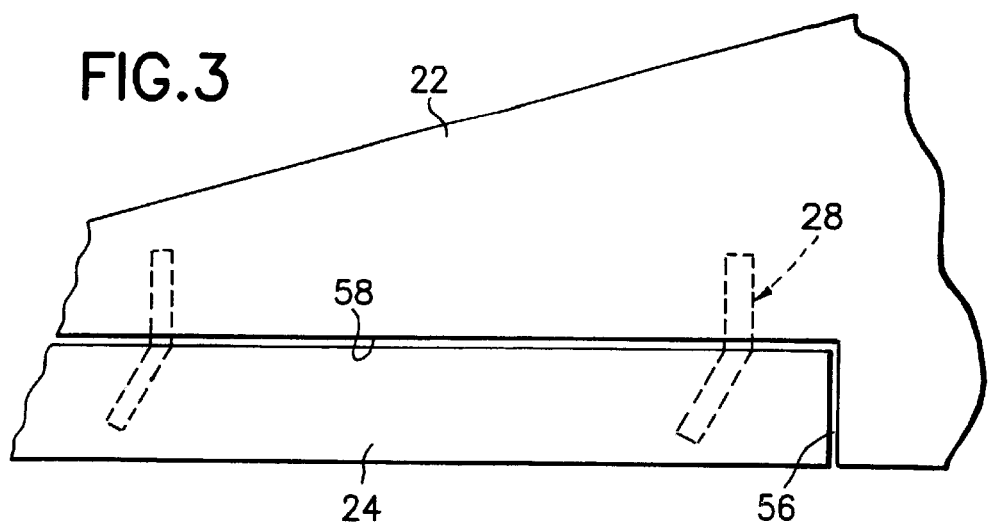
FIG. 3 is a top plan view of a portion of FIG. 1.

Referring to FIG. 1, there is shown a perspective view of an aircraft 20 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

With continued reference to FIG. 1 and turning now in addition to FIGS. 2, 3, 4, and 5, the aircraft 20, in customary fashion, includes a wing or airfoil 22 and a control surface 24. The control surface 24 is mounted on the airfoil for pivotal movement about a spanwise extending axis through a range of positions between a neutral (solid-line) position, viewing FIG. 5, at which airstream load thereon is at a minimum and a upwardly deflected (dashed line) position, in one instance, and a downwardly deflected (dashed line) position in another instance. The airstream load on the control surface is at a nominal maximum in either the upwardly deflected position or in the downwardly deflected position.

Figure 6:
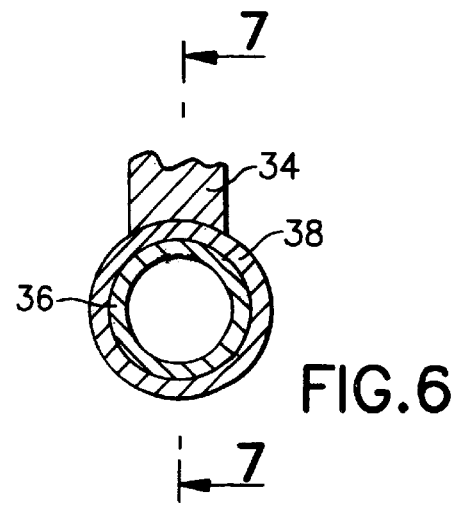
FIG. 6 is a cross section view taken generally along line 6—6 in FIG. 4.
Figure 7:
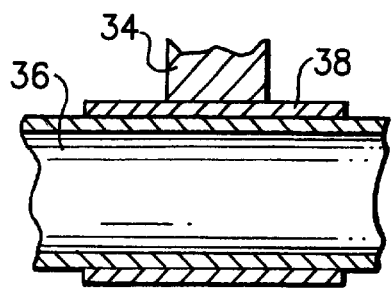
FIG. 7 is a cross section view taken generally along line 7—7 in FIG. 6.

An operator mechanism 26 (FIG. 4) is provided for moving the control surface 24 between the upwardly deflected and downwardly deflected positions. The operator mechanism 26 includes a pair of spanwise spaced rotors 28, each rotor being suitably mounted on the airfoil 22 for rotation about a chordwise extending rotary axis 30 and having a horn member 32 with a terminal end 34 offset spanwise from the rotary axis. An elongated transfer bar 36 is suitably fixed on the control surface 24, positioned so as to be associated with each rotor 28, and lies generally in the plane of the control surface. The terminal end 34 of the horn member 32 is pivotally attached to a sleeve 38 slidably and rotatably engaged with the outer peripheral surface of the transfer bar. This construction is more clearly seen with reference to FIGS. 6 and 7. In a preferred manner, the transfer bar 36 is seen to be tubular with a circular cross section, the sleeve 38 being slidably movable along the length of the transfer bar.

Figure 8:
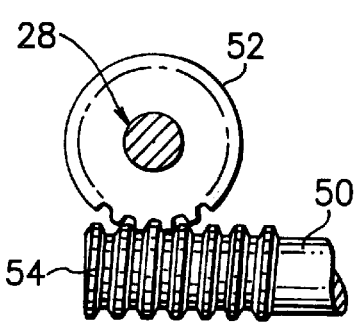
FIG. 8 is a cross section view taken generally along line 8—8 in FIG. 4.

Turning back to FIG. 4, chordwise spaced bearings 44, 46 are provided on the airfoil 22 for rotatably mounting the rotor 28 about the rotary axis 30. The operator mechanism 26 also includes a suitable rotary actuator 48, for example, for rotating each rotor 28 about its rotary axis 30. This is accomplished by means of an actuator shaft 50 which is employed for each rotor 28. As best seen in FIG. 8, a spur gear 52 is coaxially fixed on each rotor 28 and a worm gear 54 is integral with and axially aligned on the actuator shaft 50 so as to be drivingly engaged with the spur gear 52.

By reason of the slidable engagement of the follower member 38 at the terminal end 34 of the horn member 32 with the guide track 36 and with the assembly just described, as the rotary actuator 48 is operated, the control surface 24 is moved between the upwardly and downwardly deflected positions depicted in FIG. 5.

Of course, in order for the operator mechanism 26 to perform its function, it is necessary for the control surface 24 to be properly mounted on the airfoil 22. Thus, especially viewing FIGS. 2 and 3, the airfoil has a recess 56 for conformingly receiving the control surface. The recess 56 is defined in part by a spanwise extending mounting surface 58 facing the control surface 24. The flight control system for the aircraft 20 further includes a hinge mechanism 60 enabling the pivotal movement of the control surface 24 between the upwardly and downwardly deflected positions. The hinge mechanism 60 includes a pair of spanwise spaced first hinge members 62 mounted on and projecting away from the mounting surface 58 and having generally elongated apertures 64 therethrough lying generally in the plane of the airfoil 22. A pair of spanwise spaced second hinge members 66 are similarly mounted on and project away from the control surface 24 and toward the mounting surface 58. Each of the second hinge members 66 includes an integral mounting pin 68 for engageable reception in the elongated aperture 64 of an associated one of the first hinge members. The elongated apertures 64 in the hinge members 62 accommodate the necessary chordwise movement of the control surface 24 relative to the airfoil 22, specifically, of hinge 66 and pin 68 as the control surface moves between the neutral position and either of its upwardly or downwardly deflected positions.

Figure 4:
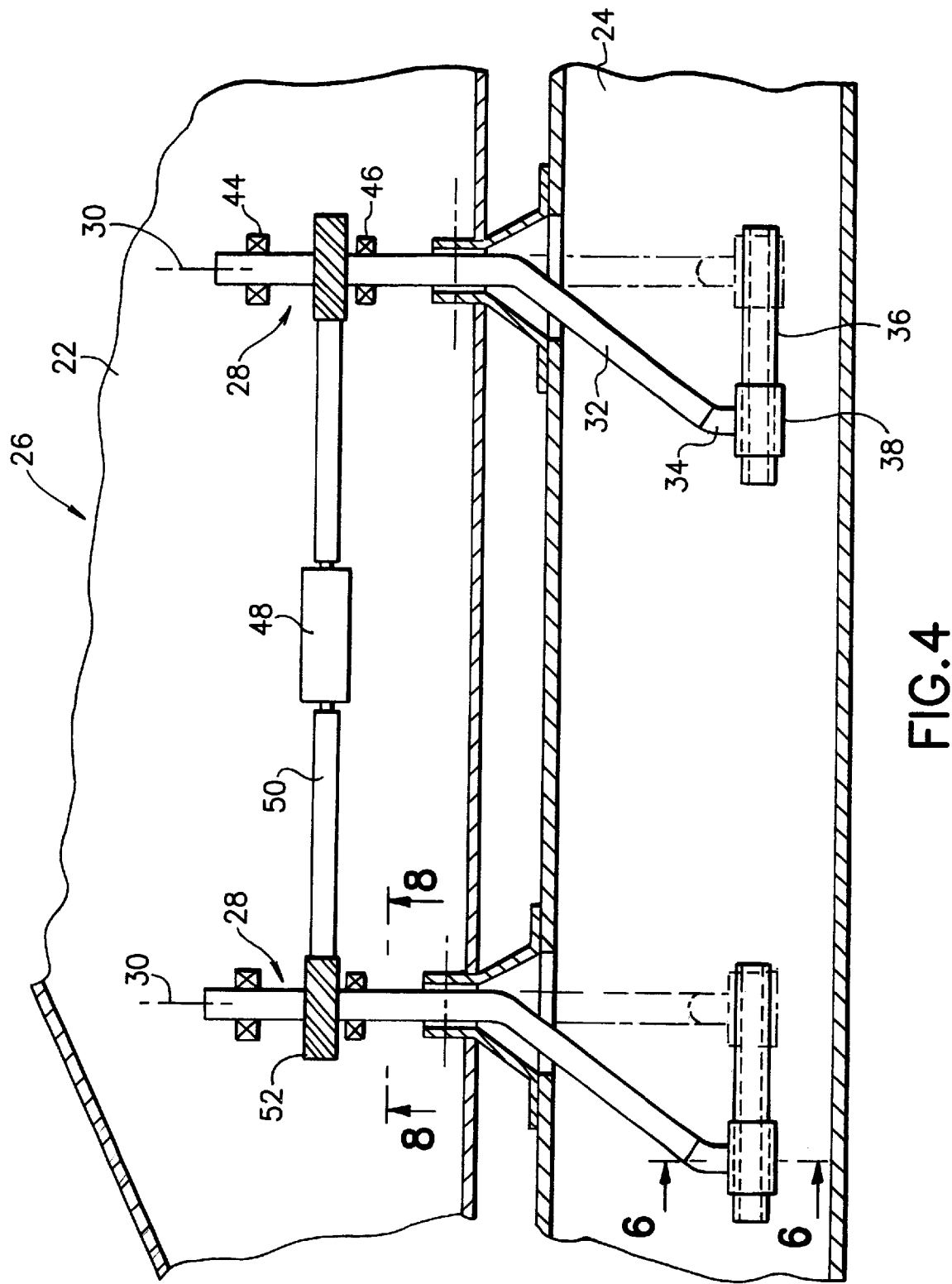
FIG. 4 is a top plan view, somewhat in section, with certain parts being broken away, illustrating in more detail the interior of the assembly depicted in FIG. 3.
Figure 9A:
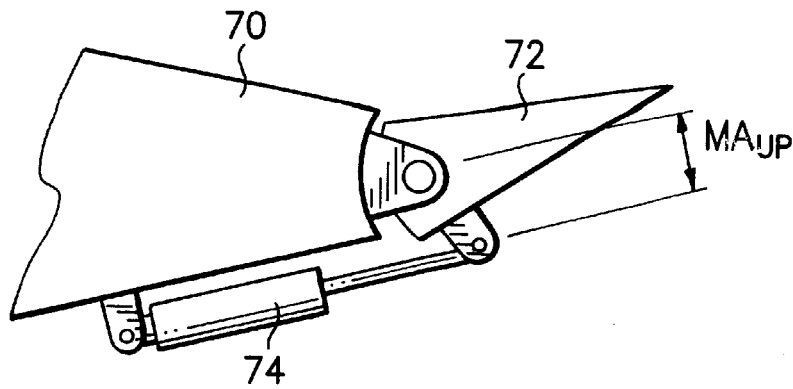
FIGS. 9A, 9B, and 9C are detail diagrammatic side elevation views illustrating successive positions of components for a conventional flight control system.
Figure 9B:
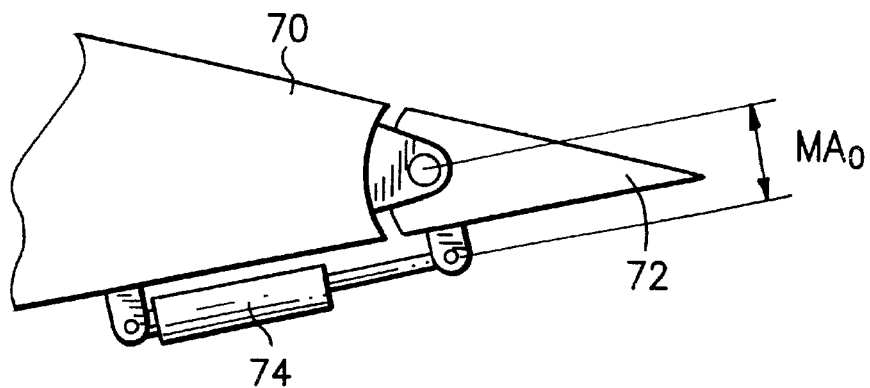
Figure 9C:
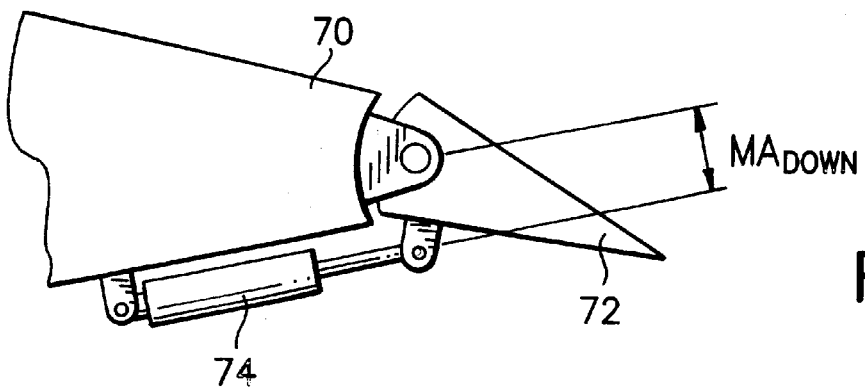

As already depicted in FIG. 4, the guide track 36 has a longitudinal axis which extending generally spanwise of the control surface 24. However, in another embodiment, depicted in FIG. 9, a modified guide track 36A may be provided in association with a modified control surface 24A having a longitudinal axis which is angularly disposed relative to the control surface, extending both spanwise and chordwise. With this construction, even greater upwardly and downwardly deflections of the control surface 24 as illustrated in FIG. 5 can be achieved for given rotations of the rotors 28 about the rotary axes 30.

With the construction already described, a primary benefit offered by the invention resides in the fact that the mechanical advantage offered by the operator mechanism 26 is maximized when the load of the airstream on the control surface 24 is also at a maximum. To explain this phenomenon, turn now, initially, to FIGS. 10A, 10B, and 10C which illustrate, diagrammatically, conventional control surface actuation. In this instance, a conventional airfoil 70 is provided with an associated conventional control surface 72 which is moved between elevated (FIG. 10A), neutral (FIG. 10B), and downwardly deflected (FIG. 10C) positions as a result of operation of an actuator 74. Moment arm in the neutral or undeflected position of the control surface 72 as seen in FIG. 10B is indicated by a reference symbol MA. Moment arm in the upwardly deflected position as seen in FIG. 10A is indicated by a reference symbol $MA_{UP}$, and in the downwardly deflected position of FIG. 10C is indicated by a reference symbol $MA_{DOWN}$. Thus, it is seen that, typically, MA is greater than $MA_{UP}$ and $MA_{DOWN}$; in other words, the greatest mechanical advantage occurs when the control surface 72 is in the neutral, or undeflected, position. Unfortunately, for this conventional construction, aerodynamic loads increase as the control surface is moved toward the deflected positions of FIGS. 10A and 10C. On traditional controls, mechanical advantage is directly proportional to moment arm.

As seen from these figures, nominally, maximum air loads on the control surface 72 occur when the control surface is in the fully deflected up (FIG. 10A) or down (FIG. 10C) positions, but unfortunately this is also the position at which the lowest mechanical advantage occurs. In order to overcome this inefficiency, then, it is necessary that the actuator 74 be of a particularly large size.

Figure 13:
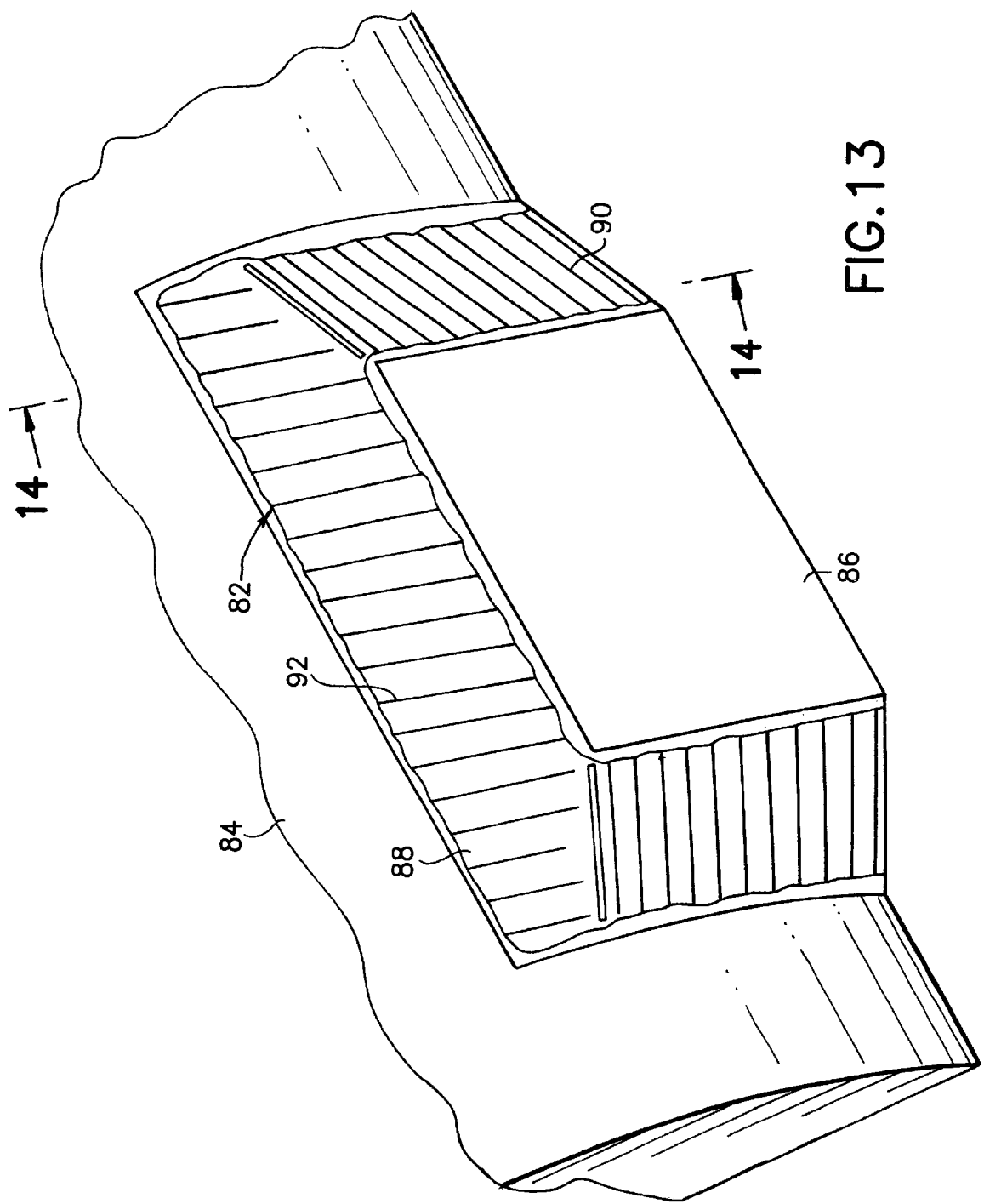
FIG. 13 is a detail perspective view, generally similar to FIG. 2 but illustrating another embodiment of the invention.

In contrast, with the present invention, mechanical advantage is inversely proportional to moment arm. Specifically, for the operator mechanism 26 of the present invention, at a neutral position of the control surface 24, viewing FIGS. 11 and 11A, rotor offset indicated at 76 is at a maximum such that the moment arm of the rotor 28 is at a maximum while the airstream loads are at a minimum. With the rotor rotated 45°, viewing FIGS. 12 and 12A, the control surface 24 is approximately 75% deflected. While the airstream loads are on the increase, rotor offset indicated at 78 is reduced from that indicated at 76 with an accompanying reduced moment arm resulting in an improved mechanical advantage. At a fully deflected position of the control surface, viewing FIGS. 13 and 13A, the airstream loads are at a maximum while rotor offset indicated at 80 is zero resulting in a maximum, or indeed infinite, mechanical advantage.

Figure 14:
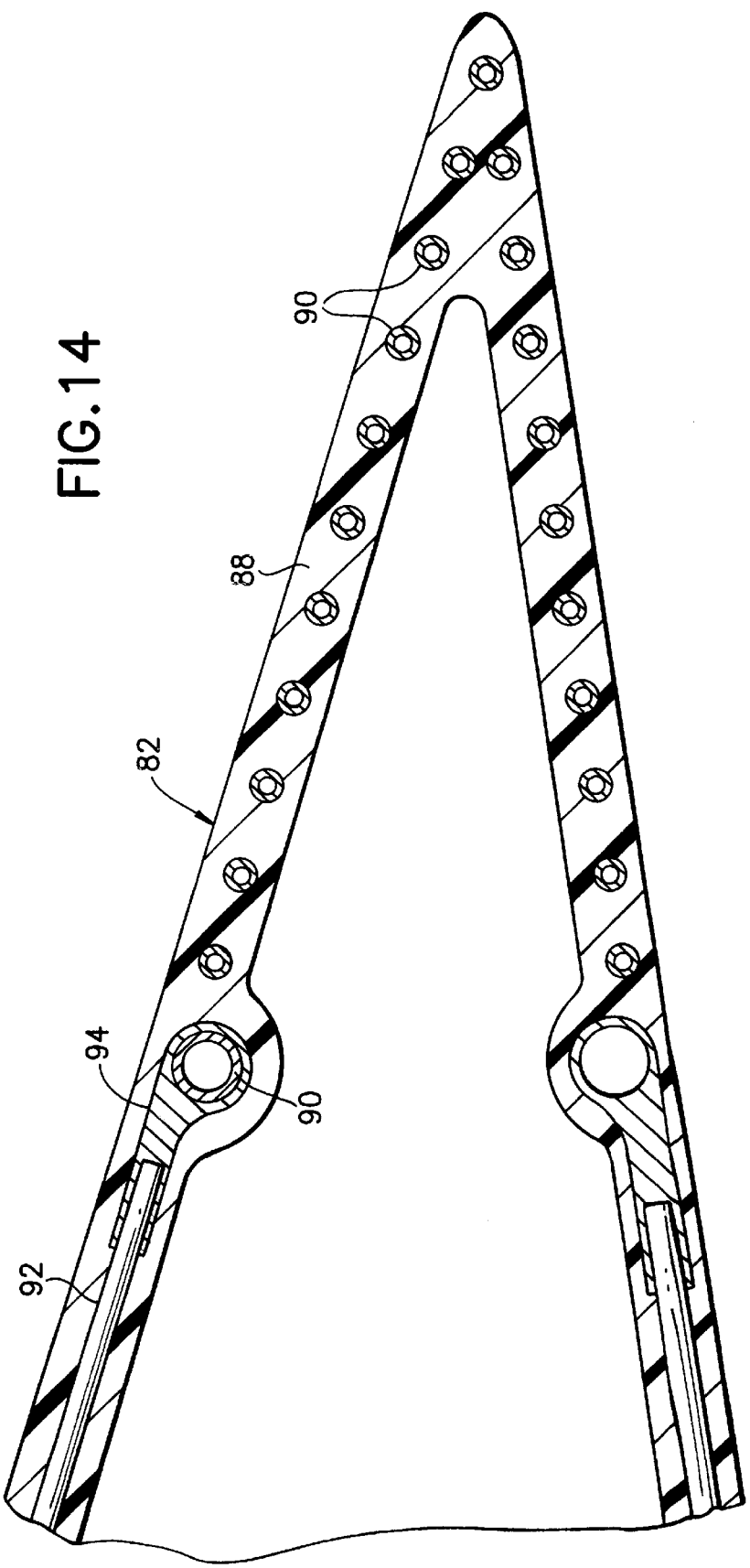
FIG. 14 is a cross section view taken generally along line 14—14 in FIG. 13.
Figure 15:
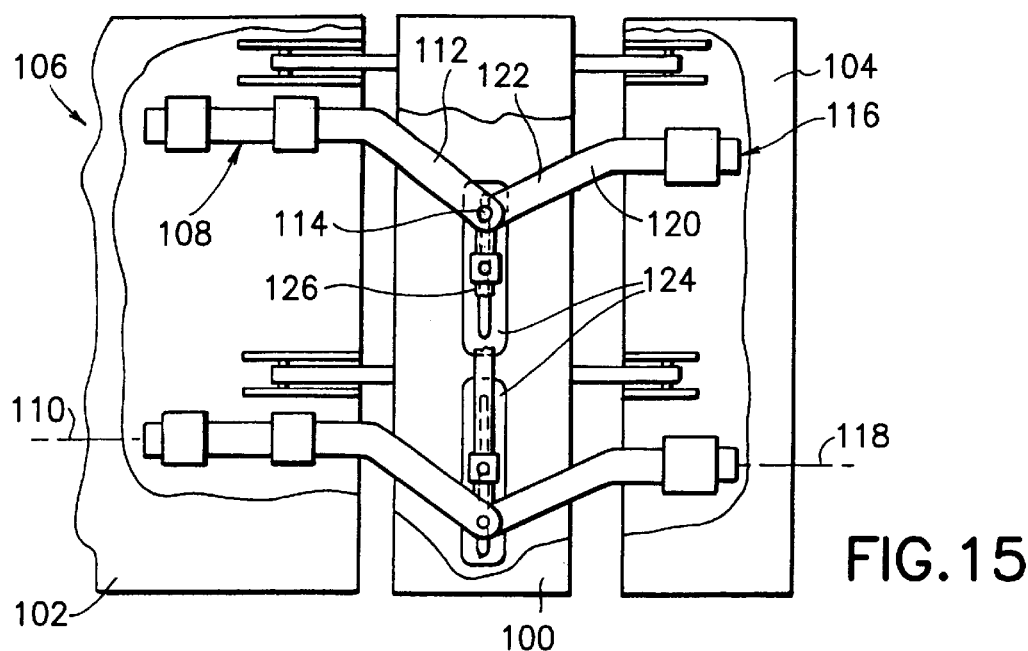
FIG. 15 is a top plan view generally similar to FIG. 4 but illustrating another embodiment of the invention.

In another embodiment of the invention seen in FIGS. 14 and 15, a flight control system for the aircraft 20 includes elastomeric transition sections 82 joining an airfoil 84 and an associated control surface 86 thereby eliminating any gap between the airfoil and the control surface. In this regard, the disclosure of commonly assigned U.S. Pat. No. 5,794,893 to Diller et al. is hereby incorporated into this disclosure in its entirety. The elastomeric transition sections 82 include elastomeric material 88 of silicone rubber or other suitable material having a plurality of first and second rods 90, 92, respectively, embedded therein and extending between the airfoil and the control surface, the first rods 90 extending generally spanwise, the second rods 92 extending generally chordwise. The rods 90, 92 are preferably composed of a material selected from the group consisting of: fiberglass, graphite, steel and aluminum.

As seen in FIG. 15, the elastomeric transition sections 82 also include a plurality of transition couplings 94 pivotally connected, respectively with a plurality of the first rods 90 across the span of the inboard and outboard elastomeric transition sections and of the second rods 92 adjacent the interface between the control surface 86 and the airfoil 84.

Figure 16:
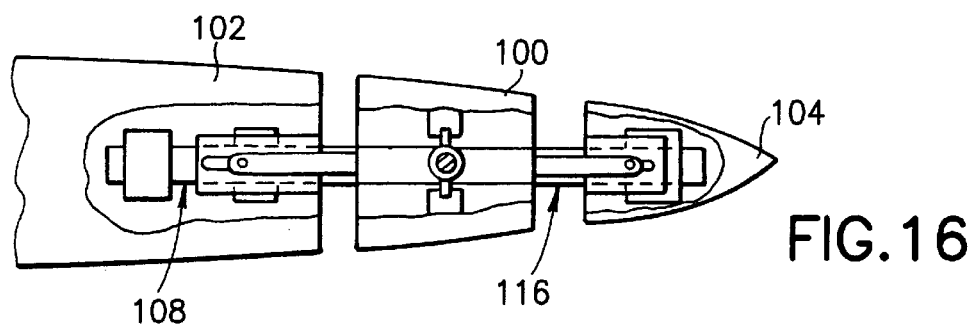
FIG. 16 is a side elevation view of the embodiment illustrated in FIG. 15 and depicting a neutral orientation thereof.
Figure 17:
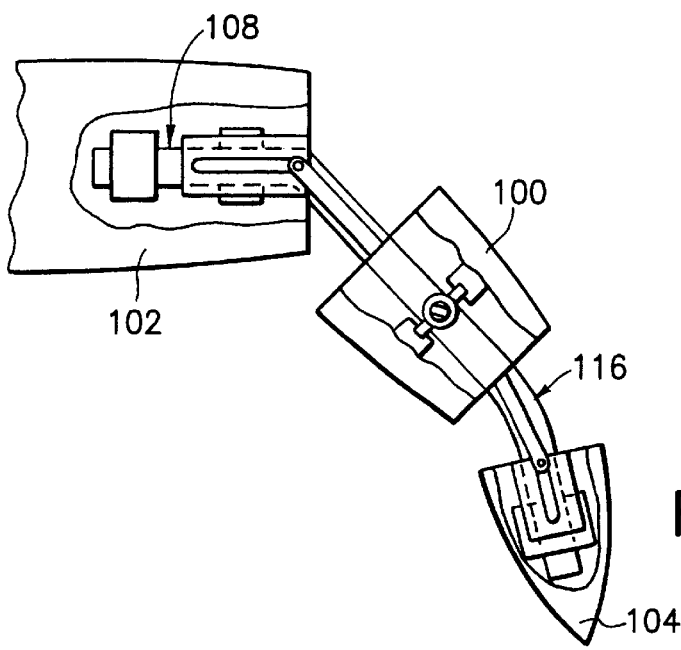
FIG. 17 is a side elevation view, similar to FIG. 16, but depicting the components thereof in a downwardly deflected position.

Turn now to FIGS. 16, 17, and 18 for still another embodiment of the invention. In this instance, as in the previous embodiments, a first control surface 100 is mounted on an airfoil 102 for pivotal movement about a spanwise extending axis generally in the manner described for the control surface 24 and airfoil 22. A second control surface 104 is also mounted on the airfoil 102, via the first control surface 100, for pivotal movement about a spanwise extending axis. The second control surface 104 is generally parallel with the first control surface and is spaced from the first control surface in the chordwise direction.

The first and second control surfaces are movable through a range of positions between a neutral position (FIG. 17) at which airstream load thereon is a minimum and an upwardly deflected position, in one instance, and a downwardly deflected position (FIG. 18) in another instance. The airstream load on the control surfaces 100, 104 is a maximum when the control surfaces assume either the upwardly deflected position or the downwardly deflected position.

An operator mechanism 106, generally similar to the operator mechanism 26, is provided for moving the first and second control surfaces 100, 104, respectively, between the upwardly deflected and downwardly deflected positions. The operator mechanism 106 includes a pair of spanwise spaced active rotors 108, each rotor mounted on the airfoil 102 for rotation about a chordwise extending rotary axis 110 and having an active horn member 112 with a terminal end 114 offset from the rotary axis. A pair of spanwise spaced passive rotors 116 are mounted on the second control surface 104 for rotation about a chordwise extending rotary axis 118. Each passive rotor 116 has a passive horn member 120 with a terminal end 122 offset from the rotary axis 118. An elongated spanwise extending guide track 124 is associated with each pair of rotors 108, 116 and is integral with, and generally in the plane of, the control surface 100. The terminal ends 114, 122 of the active and passive horn members, respectively, are pivotally engaged to one another and both are slidably engaged with the guide track 124. A spanwise extending transfer bar 126 connects the two sets of active rotors 108 and passive rotors 116 to assure their unitary movement.

An actuator, not shown in this instance, but generally similar to rotary actuator 48 seen in FIG. 4, is provided with associated shafts and gearing for rotating each active rotor 108 about the rotary axis 110. By reason of the slidable engagement of the terminal ends 114, 122 of the active and passive horn members 112, 120 with the guide tracks 124, the first and second control surfaces 100, 104 are thereby moved between the upwardly deflected and downwardly deflected positions. As in the instance of the embodiment disclosed with the aid of FIGS. 1–8, the mechanical advantage offered by the operator mechanism 106 is maximized when the load of the airstream on the control surfaces 100, 104 is also at a maximum.

In recapitulation, aerodynamics of an aircraft embodying the invention are improved by means of the extending controls which provide greater control power, roll power, and lift power because chord length is directly proportional to lift. Further, as to CMT (continuous moldline technology) the invention serves, desirably, to always impart tension to the elastomeric transition members by providing extension along with rotation of the control surface.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A flight control system for a generally planar airfoil subjected to an advancing airstream and extending in spanwise and chordwise directions comprising:
    a control surface mounted on the airfoil for pivotal movement about a spanwise extending axis through a range of positions between a neutral position at which airstream load thereon is a minimum and a upwardly deflected position, in one instance, and a downwardly deflected position in another instance, the airstream load on the control surface being a maximum in either the upwardly deflected position or in the downwardly deflected position; and
    an operator mechanism for moving the control surface between the upwardly deflected and downwardly deflected positions, the operator mechanism including:
        a rotor mounted on the airfoil for rotation about a chordwise extending rotary axis and having a horn member with a terminal end offset from the rotary axis;
        an elongated transfer member fixed on the control surface and lying generally in the plane of the control surface, the terminal end of the horn member being pivotally attached to a sleeve slidably engaged with the transfer member for movement thereon; and
        an actuator for rotating the rotor about the rotary axis and by reason of the slidable engagement of the sleeve on the transfer
    member thereby moving the control surface between the upwardly deflected and downwardly deflected positions;
        whereby the mechanical advantage offered by the operator mechanism is maximized when the load of the airstream on the control surface is also at a maximum.

2. A flight control system as set forth in claim 1 including:
    chordwise spaced bearings for rotatably mounting the rotor thereon; and
    wherein the operator mechanism includes:
    a rotary actuator mounted on the airfoil;
    an actuator shaft;
    a spur gear fixed on the rotor and coaxial therewith; and
    a worm gear fixed on the actuator shaft drivingly engaged with the spur gear.

3. A flight control system as set forth in claim 1 wherein the airfoil has a recess for conformingly receiving the control surface, the recess defined in part by a spanwise extending mounting surface facing the control surface; and
    including a hinge mechanism enabling the pivotal movement of the control surface between the upwardly deflected position and the downwardly deflected position.

4. A flight control system as set forth in claim 3
    wherein the hinge mechanism includes:
        a pair of spanwise spaced first hinge members projecting away from the mounting surface and having generally elongated chordwise extending apertures therethrough lying generally in the plane of the airfoil; and
        a pair of spanwise spaced second hinge members projecting away from the control surface and toward the mounting surface, each of the second hinge members including an integral mounting pin for engageable reception in the elongated aperture of an associated one of the first hinge members.

5. A flight control system as set forth in claim 1
    wherein the transfer bar has a longitudinal axis extending generally spanwise of the control surface.

6. A flight control system as set forth in claim 1 including:
    elastomeric transition sections joining the airfoil and the control surface thereby eliminating any gap between the airfoil and the control surface.

7. A flight control system as set forth in claim 6
    wherein the elastomeric transition sections include elastomeric material having a plurality of first and second rods embedded therein and extending between the airfoil and the control surface, the first rods extending generally spanwise, the second rods extending generally chordwise.

8. A flight control system as set forth in claim 7
    wherein the elastomeric transition sections include elastomeric material comprising silicone rubber.

9. A flight control system as set forth in claim 7
    wherein the rods are composed of a material selected from the group consisting of: fiberglass, graphite, steel and aluminum.

10. A flight control system as set forth in claim 6
    wherein the elastomeric transition sections include a plurality of transition rods pivotally connected, respectively with a plurality of the first rods across the span of the control surface and of the second rods adjacent the interface between the control surface and the airfoil.

11. A flight control system for a generally planar airfoil subjected to an advancing airstream and extending in spanwise and chordwise directions comprising:
    a control surface mounted on the airfoil for pivotal movement about a spanwise extending axis through a range of positions between a neutral position at which airstream load thereon is a minimum and a upwardly deflected position, in one instance, and a downwardly deflected position in another instance, the airstream load on the control surface being a maximum in either the upwardly deflected position or in the downwardly deflected position; and
    an operator mechanism for moving the control surface between the upwardly deflected and downwardly deflected positions, the operator mechanism including:
        a pair of spanwise spaced rotors, each rotor mounted on the airfoil for rotation about a chordwise extending rotary axis and having a horn member with a terminal end offset from the rotary axis;
        an elongated transfer member associated with each rotor, the transfer member being fixed on the control surface and lying generally in the plane of the control surface, the terminal end of the horn member being pivotally attached to a sleeve slidably engaged with the transfer member for movement thereon; and
        an actuator for rotating each rotor about the rotary axis and by reason of the slidable engagement of the sleeve on the transfer member thereby moving the control surface between the upwardly deflected and downwardly deflected positions;
        whereby the mechanical advantage offered by the operator mechanism is maximized when the load of the airstream on the airfoil is also at a maximum.

12. A flight control system as set forth in claim 11 including:
    chordwise spaced bearings for rotatably mounting the rotor thereon; and
    wherein the operator mechanism includes:

a rotary actuator mounted on the airfoil;

first and second axially aligned actuator shafts;

a first spur gear fixed on the first rotor and coaxial therewith;

a second spur gear fixed on the second rotor and coaxial therewith;

a first worm gear fixed on the first actuator shaft drivingly engaged with the first spur gear; and a second worm gear fixed on the second actuator shaft drivingly engaged with the second spur gear.

13. A flight control system for a generally planar airfoil subjected to an advancing airstream and extending in spanwise and chordwise directions comprising:

a first control surface mounted on the airfoil for pivotal movement about a spanwise extending axis;

a second control surface mounted on the airfoil for pivotal movement about a spanwise extending axis, the second control surface being generally parallel with the first control surface and being spaced therefrom in the chordwise direction;

the first and second control surfaces being movable through a range of positions between a neutral position at which airstream load thereon is a minimum and an upwardly deflected position, in one instance, and a downwardly deflected position in another instance, the airstream load on the control surface being a maximum in either the upwardly deflected position or in the downwardly deflected position; and an operator mechanism for moving the first and second control surfaces between the upwardly deflected and downwardly deflected positions, the operator mechanism including:

a pair of spanwise spaced active rotors, each rotor mounted on the airfoil for rotation about a chordwise extending rotary axis and having an active horn member with a terminal end offset from the rotary axis;

a pair of spanwise spaced passive rotors, each rotor mounted on the second control surface for rotation about a chordwise extending rotary axis and having a passive horn member with a terminal end offset from the rotary axis;

an elongated transfer member associated with each rotor, the transfer member being fixed on the control surface and lying generally in the plane of, the control surface, the terminal ends of the active and passive horn members being pivotally attached to a sleeve slidably engaged with the transfer member for movement thereon; and an actuator for rotating each active rotor about the rotary axis and by reason of the slidable engagement of the sleeve on the transfer member thereby moving the first and second control surfaces between the upwardly deflected and downwardly deflected positions;

whereby the mechanical advantage offered by the operator mechanism is maximized when the load of the airstream on the first and second control surfaces is also at a maximum.

14. A flight control system for a generally planar airfoil subjected to an advancing airstream and extending in spanwise and chordwise directions comprising:

a control surface mounted on the airfoil adjacent a mounting surface for pivotal movement about a spanwise extending axis through a range of positions between a neutral position at which airstream load thereon is a minimum and a upwardly deflected position, in one instance, and a downwardly deflected position in another instance, the airstream load on the control surface being a maximum in either the upwardly deflected position or in the downwardly deflected position;

a hinge mechanism pivotally mounting the control surface on the airfoil for movement between the upwardly deflected position and the downwardly deflected position and also allowing chordwise movement of the airfoil as it moves between the upwardly deflected position and the downwardly deflected position;

a rotor mounted on the airfoil for rotation about a chordwise extending rotary axis and having a horn member with a terminal end offset from the rotary axis;

a transfer member fixed on the control surface operatively engaged with the horn member; and an actuator for rotating the rotor about the rotary axis and by reason of the transfer member thereby moving the control surface between the upwardly deflected and downwardly deflected positions;

whereby the mechanical advantage offered by the operator mechanism is maximized when the load of the airstream on the control surface is also at a maximum.

15. A flight control system as set forth in claim 14 wherein the hinge mechanism includes:

a pair of spanwise spaced first hinge members projecting away from the mounting surface and having generally elongated apertures therethrough lying generally in the plane of the airfoil; and a pair of spanwise spaced second hinge members projecting away from the control surface and toward the mounting surface, each of the second hinge members including an integral mounting pin for engageable reception in the elongated aperture of an associated one of the first hinge members.

* * * * *